Dec. 10, 1929.  A. ANDREWS  1,738,512
MECHANICAL MOVEMENT
Filed Dec. 9, 1927  3 Sheets-Sheet 3
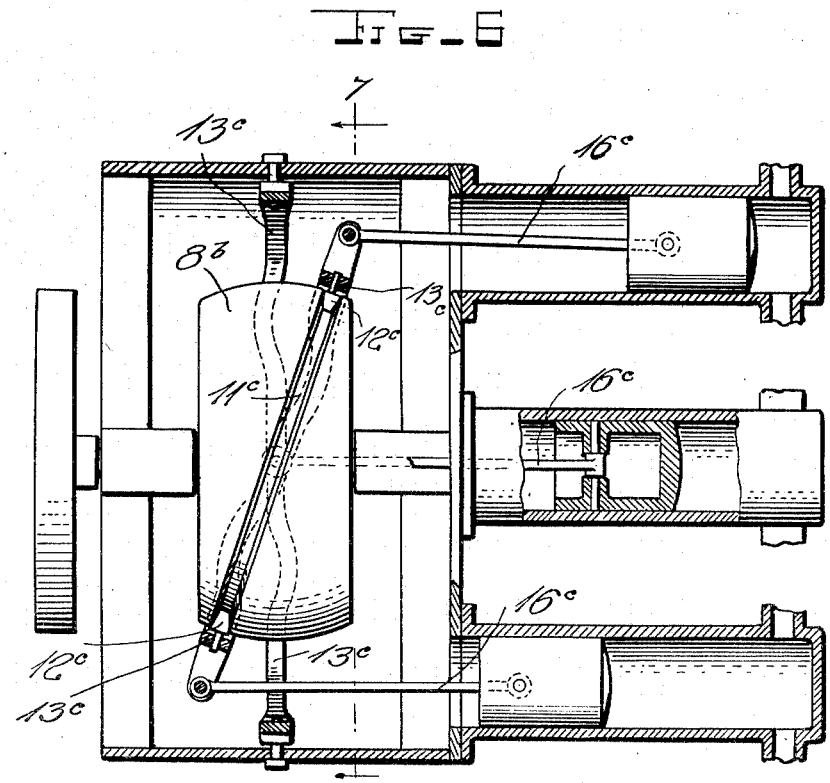
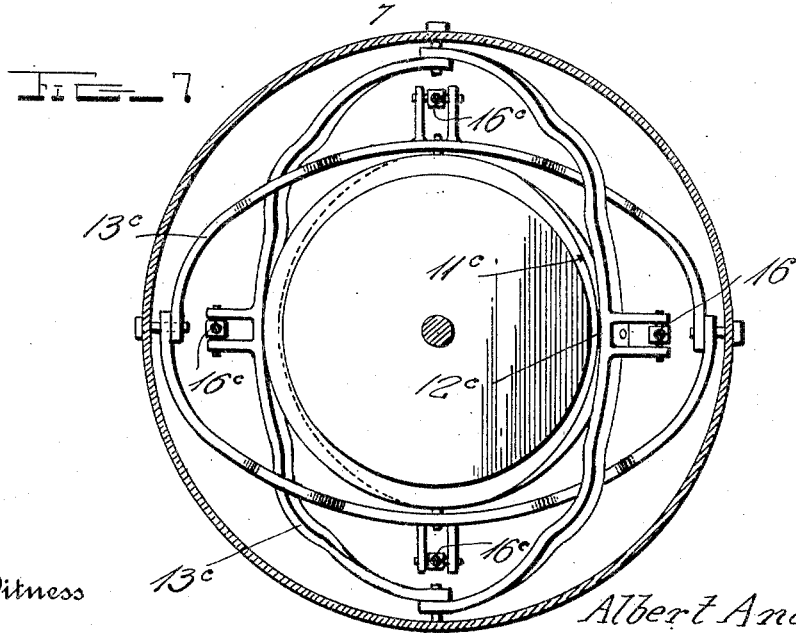

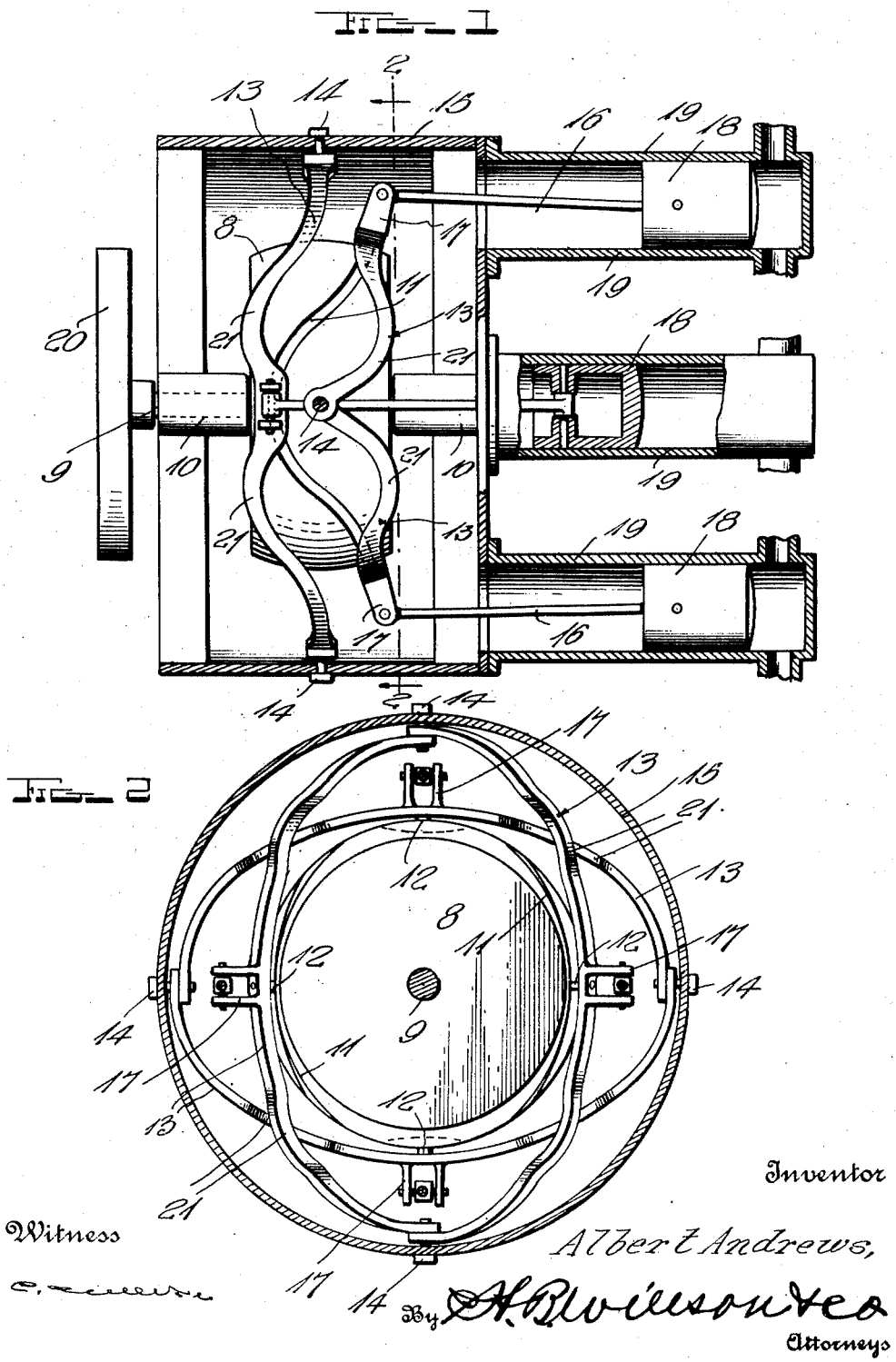

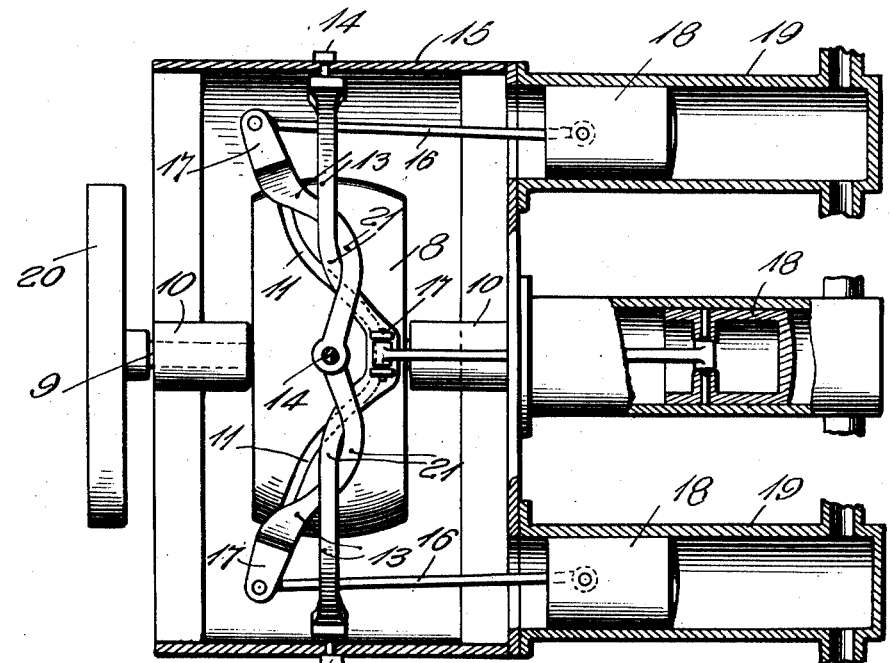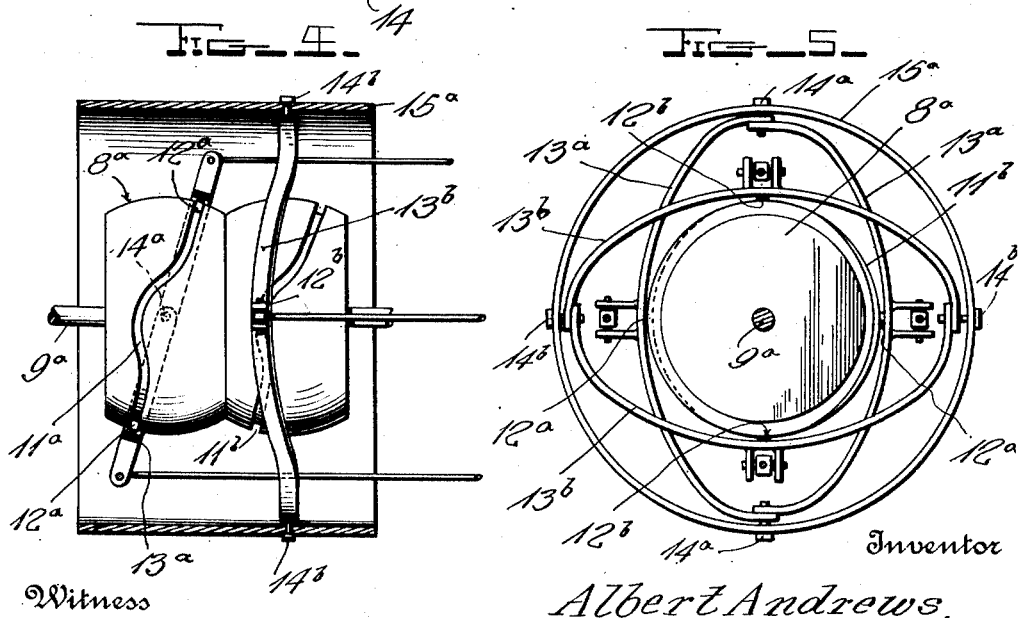

Patented Dec. 10, 1929

1,738,512

UNITED STATES PATENT OFFICE

ALBERT ANDREWS, OF DEADWOOD, SOUTH DAKOTA

MECHANICAL MOVEMENT

Application filed December 9, 1927. Serial No. 238,918.

The invention relates to mechanical movements for converting either reciprocatory or oscillatory motion, into rotary motion, or vice versa, and it has reference to a specific type of motion-converting means in which a rotatable body is provided with continuous peripheral, cam trackage with which shoes or travelers are engaged to move longitudinally of the axis of rotation of said body, as the latter rotates. Partially successful converting means of this type, when heretofore used in engines or for other heavy duty, have required that cross-heads and co-acting guides be employed to hold the shoes or travelers in engagement with the cam trackage. These cross-heads and guides have created a great deal of friction and have consequently been short lived, eventually causing excessive knocking and injurious vibration.

It is the object of my invention to improve upon the construction of motion-converting means of the type set forth, in such a manner as to eliminate all cross-heads and guides, yet to effectively retain the shoes and the cam trackage in engagement.

With the foregoing in view, the invention resides in the novel subject matter hereinafter described and claimed, description being accomplished by reference to the accompanying drawings.

Fig. 1 is a top plan view partly in horizontal section showing one form of the invention.

Fig. 2 is a vertical transverse sectional view on line 2—2 of Fig. 1.

Fig. 3 is a view similar to Fig. 1 but illustrating the shoe-carrying yokes in different positions.

Figs. 4 and 5 are views similar to Figs. 1 and 2 but showing a different form of construction.

Figs. 6 and 7 are views similar to Figs. 1 and 2 but showing a still further form of construction.

In Figs. 1 and 2, the numeral 8 denotes a circular body rotatably mounted by means of a shaft 9 and appropriately supported bearings 10, said body being preferably a section of a sphere. This body 8 is provided with a continuous peripheral track which is preferably, although not necessarily, in the form of a groove, said track being shown at 11. All points along the length of this track, are equi-distant from a common center within the body 8 and disposed at the axis of rotation of said body.

A plurality of shoes or travelers 12 are spaced apart circumferentially of the body 8, and a plurality of U-shaped yokes 13 have their intermediate portions suitably connected to said shoes or travelers, said yokes straddling the body 8 as shown. Pivots 14 are provided for the yoke ends, and the pivots of each yoke are disposed on a line which traverses the above mentioned common center and intersects the aforesaid axis of rotation of the body 8. Thus, the yokes may swing longitudinally of this axis of rotation and as they so swing, the shoes or travelers 12 remain the same distance from the common center within the body 8, and as all points along the length of the track 11 are equi-distant form said common center, it follows that the shoes are effectively maintained in engagement with the track, without the necessity of using cross-heads and co-operable guides.

Stationary, non-rotatable supporting means 15 is provided for the pivots 14, and when the invention is embodied in an engine or a pump, as herein disclosed, this supporting means 15 may be an enclosure for the body 8 and the movable parts which co-operate with said body.

Independent members 16, of either oscillatory or reciprocatory nature, are appropriately connected at 17 with the intermediate portions of the yokes 13, respectively. In the present showing, these members 16 are piston rods connected to pistons 18 disposed within cylinders 19, and it may be considered that some adequate expansive force acting on the pistons 18, effects movement of the yokes 13, causing the co-operable shoes 12 and track 11 to produce rotation of the body 8, shaft 9 and fly-wheel 20 secured to said shaft, or it may be considered that the body 8 may be rotated, thus causing the track 11 and shoes 12 to effect oscillation of the yokes 13 to reciprocate the pistons 18. In the first instance, the invention would be embodied in an engine, and in the second instance, in a pump.

To overcome interference between the yokes 13, portions of their arms are offset as shown at 21, and these offsets accommodate each other as shown in Fig. 3 preventing the several yokes from striking each other during operation.

In Figs. 4 and 5, a body $8^a$ is shown, of a shape which would be produced by placing two bodies such as 8, end to end. Body $8^a$ is rotatably mounted on a shaft $9^a$ and is formed with at least two continuous, peripheral tracks $11^a$—$11^b$, preferably grooved. Two diametrically opposed shoes $12^a$ are shown engaging one of the tracks $11^a$ and two diametrically opposed shoes $12^b$ are shown engaging the other track $11^b$, the shoes $12^a$ being circumferentially spaced ninety degrees from the shoes $12^b$. U-shaped yokes $13^a$ carry the shoes $12^a$ and similar yokes $13^b$ carry the shoes 12, all of said yokes straddling the body $8^a$. Pivots $14^a$ are provided for the yokes $13^a$ and pivots $14^b$ are employed for the yokes $13^b$, all of these pivots being engaged with a stationary, non-rotatable support $15^a$. The pivots $14^a$ are disposed on a line which intersects the axis of rotation of the body $8^a$ and traverses a common center, from which all portions of the track $11^a$, are equi-distant. Similarly, the pivots $14^b$ are disposed on another line which intersects the axis of rotation of the body $8^a$ and traverses a second common center within said body, from which all parts of the other track $11^b$, are equi-distant. It thus follows that as the yokes oscillate and the body $8^a$ rotates, said yokes at all times effectively hold the shoes in proper engagement with the cam tracks, and due to the relation of these yokes, they will not interfere with each other, even if they be provided with no offset portions such as 21 (above described).

In the forms of construction so far described, no one of the tracks 11—$11^a$—$11^b$, is disposed throughout its circumference in a single plane and hence the yokes carrying the shoes engaged with any track, must rock relatively about their pivots. Figs. 6 and 7 however, disclose a construction in which the rotatable body $8^b$ is provided with a continuous peripheral cam groove $11^c$, disposed throughout its circumference in a single plane, which plane is oblique to the axis of rotation of said body. Engaging this track, are shoes $12^c$ carried by yokes $13^c$ of the same general form and mounted in the same manner as the yokes 13. Any desired independent members, such as the piston rods $16^c$, may be connected with the intermediate portions of the yokes $13^c$.

It will be observed that any form of the invention is rather simple and inexpensive, yet that it will be efficient and reliable, particular attention being invited to the fact that the oscillatory yokes serve to at all times hold the shoes or travelers in proper engagement with the track or tracks, without the necessity of employing cross-heads and co-operable guides, with the difficulties hereinbefore pointed out.

While excellent results are obtainable from the general construction herein disclosed, it is to be understood that within the scope of the invention as claimed, variations may be made.

I claim:—

1. A mechanical movement comprising a rotatably mounted body having a continuous peripheral cam track which at all points is equi-distant from a common center within said body and disposed at the axis of rotation of the latter; a plurality of shoes engaging said cam track and spaced apart about the periphery of said body, a plurality of independently movable U-shaped yokes straddling said body and having their intermediate portions connected with said shoes, pivots for the ends of said yokes, the pivots of each yoke being located on a line traversing the aforesaid common center and intersecting said axis of rotation; rigid supporting means carrying said pivots, and independent members connected to said intermediate portions of said yokes.

2. A mechanical movement comprising a rotatably mounted body having at least two continuous peripheral cam tracks spaced apart in the direction taken by the axis of rotation of said body, all points of one track being equi-distant from a common point within said body disposed at said axis, all points of the other track being equi-distant from another common point within said body at said axis; at least two shoes spaced apart circumferentially of the body and engaging said tracks respectively, at least two U-shaped yokes straddling said body and connected at their intermediate portions with said shoes respectively, pivots for the ends of said yokes, the pivots of one yoke being disposed on a line traversing one of said common centers and intersecting said axis, the pivots of the other yoke being disposed on a second line traversing the other of said common centers and intersecting said axis; rigid supporting means carrying said pivots, and independent members connected to said intermediate portions of said yokes.

In testimony whereof I have hereunto affixed my signature.

ALBERT ANDREWS.